(12) United States Patent
Julius

(10) Patent No.: US 7,431,375 B1
(45) Date of Patent: Oct. 7, 2008

(54) COVER FOR PROTECTING WINDSHIELD AND WINDOWS FROM SNOW

(76) Inventor: Don Julius, 1020 Washoan Blvd., South Lake Tahoe, CA (US) 85150

( * ) Notice: Subject to any disclaimer, the term of this patent is extended or adjusted under 35 U.S.C. 154(b) by 277 days.

(21) Appl. No.: 11/198,695

(22) Filed: Aug. 4, 2005

(51) Int. Cl.
B60J 1/20 (2006.01)

(52) U.S. Cl. .................. 296/95.1; 150/168; 160/370.21

(58) Field of Classification Search ............... 296/95.1, 296/96, 97.7; 150/166, 168; 160/370.21, 160/370.22, 370.23
See application file for complete search history.

(56) References Cited

U.S. PATENT DOCUMENTS

| | | | | |
|---|---|---|---|---|
| 4,597,608 | A * | 7/1986 | Duffy | 296/95.1 |
| 4,598,883 | A * | 7/1986 | Suter | 244/1 R |
| 4,726,406 | A * | 2/1988 | Weatherspoon | 150/168 |
| 4,842,324 | A * | 6/1989 | Carden | 296/136.11 |
| 4,903,749 | A * | 2/1990 | Hanania | 160/370.21 |
| 5,029,933 | A * | 7/1991 | Gillem | 296/136.11 |
| 5,035,460 | A * | 7/1991 | Huang | 296/95.1 |
| 5,161,849 | A * | 11/1992 | Holland, Jr. | 296/95.1 |
| 5,273,316 | A * | 12/1993 | Infante | 280/770 |
| 5,435,362 | A * | 7/1995 | Chiang | 150/166 |
| 5,497,819 | A * | 3/1996 | Chiang | 150/166 |
| 5,615,923 | A * | 4/1997 | Madison | 296/95.1 |
| 5,816,641 | A * | 10/1998 | Chen | 296/95.1 |
| 6,076,577 | A * | 6/2000 | Ontaneda | 150/168 |
| 6,220,648 | B1 * | 4/2001 | Daniel | 296/136.02 |
| 6,513,853 | B2 | 2/2003 | Langley | 296/65.1 |
| 6,641,203 | B1 * | 11/2003 | Everett | 296/136.11 |
| 6,705,337 | B1 * | 3/2004 | Peckham | 135/88.07 |
| 6,997,503 | B2 * | 2/2006 | Fukagawa | 296/136.13 |
| 7,219,616 | B2 * | 5/2007 | Pritchett | 114/361 |
| 2002/0078987 | A1 * | 6/2002 | Montes | 135/87 |
| 2003/0226627 | A1 * | 12/2003 | Clark | 150/166 |
| 2004/0227373 | A1 * | 11/2004 | Robbins | 296/95.1 |
| 2005/0093332 | A1 * | 5/2005 | Thrasher et al. | 296/136.02 |
| 2005/0242610 | A1 * | 11/2005 | Galindo | 296/95.1 |
| 2006/0000529 | A1 * | 1/2006 | Le | 150/168 |
| 2006/0220400 | A1 * | 10/2006 | Diamond | 293/126 |

* cited by examiner

Primary Examiner—Jason S Morrow
(74) Attorney, Agent, or Firm—Lewis and Roca LLP

(57) ABSTRACT

A cover comprising: a roof panel having a front side, a back side, a right side, and a left side all forming the perimeter of the roof panel, the roof panel sized to substantially cover a roof; a front panel attached to the roof panel along the front side of the roof panel and sized to substantially cover a front windshield; a passenger side panel attached to the roof panel along the left side of the roof panel and sized to substantially cover a passenger side window; a driver side panel attached to the roof panel along the right side of the roof panel and sized to substantially cover a driver side window; and at least one strap attached to each of the front panel, passenger side panel, and driver side panel, wherein the at least one strap comprises a magnet for attaching the strap to the automobile.

14 Claims, 4 Drawing Sheets

COVER FOR PROTECTING WINDSHIELD AND WINDOWS FROM SNOW

BACKGROUND

The present invention relates to an automobile cab cover device. More particularly, the present invention relates to a device for covering the windshield, the windshield wipers, the front window glasses of the driver's and passenger side upper doors, and, on most vehicles, the door handles and keyholes.

Protecting an automobile's window and windshield from snow can be an aggravating task. Current covers either have trouble staying in place or are a hassle to use.

What is needed in the art is a window and windshield cover that is both secure and easy use.

SUMMARY

The present invention discloses a useful, novel and unobvious invention for protecting the windshield, the windshield wipers, and the front window glasses of the driver's and passenger side upper doors from snow.

DETAILED DESCRIPTION

Persons of ordinary skill in the art will realize that the following disclosure is illustrative only and not in any way limiting. Other embodiments of the invention will readily suggest themselves to such skilled persons having the benefit of this disclosure.

The present invention is a protective cover for the forward cab portion of an automobile, including the windshield, windshield wipers and the door glass of the driver's side and passenger side doors. The cover prevents the vehicle's operator from having to scrape ice and snow from the surfaces of the automobile. The cover may be used on automobiles including, but not limited to, sedans, SUVs, trucks, minivans, vans, convertibles, coupes, hatchbacks, and station wagons. On many automobile models, the cab cover device may also protect the door handles and keyholes of the vehicle's front doors from accumulating ice and snow.

The cover may also be used to protect the aforementioned vehicle surfaces from sun and excessive heat inside the vehicle.

FIGS. 1-4 illustrate the protective cover of the present invention with like components being numbered alike.

Figure 1:
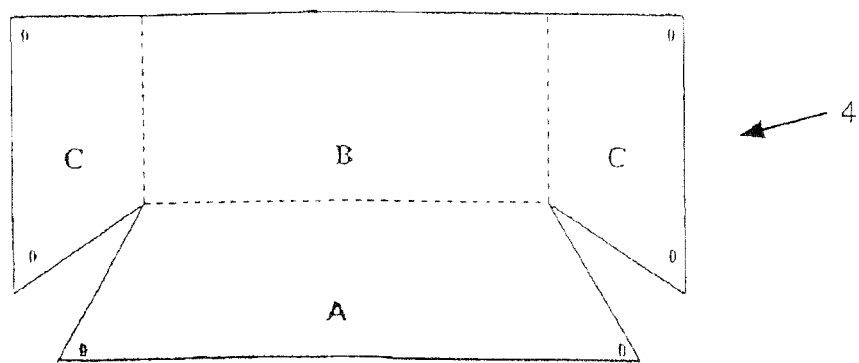
FIG. 1 is a plan view of an exemplary automobile cab cover device according to the present invention.

As seen in FIG. 1, protective automobile cab cover 4 preferably comprises four panels. Panel B, the roof panel, has a front side, a back side, a right side, and a left side all forming the perimeter of panel B. Panel B is designed to substantially cover the roof of an automobile, and may be about the same size as the roof. Panel A, the front panel, is attached to panel B along the front side of panel B. Panel A is designed to substantially cover the front windshield of an automobile, and may be about the same size as the front windshield. One panel C, the passenger side panel, is attached to panel B along the left side of panel B. The passenger side panel is designed to substantially cover the front passenger side window of an automobile, and may be about the same size as the front passenger side window. The other panel C, the driver side panel, is attached to panel B along the right side of panel B. The driver side panel is designed to substantially cover the front driver side window of an automobile, and may be about the same size as the front driver side window.

However, it is also contemplated that the passenger side panel and the driver side panel may each be about half the size of their corresponding windows. The passenger side panel and the driver side panel may also be larger than their corresponding windows so as to cover the passenger side door handle and keyhole and the driver side door handle and keyhole.

In a preferred embodiment, a gap exists between the side edges of panels A and C so that they do not form one, long, continuous piece. Instead, panels A and C do not meet, if at all, until they are near panel B. This configuration allows for cover 4 to accommodate automobiles of different shapes and sizes. However, in the alternative, it is contemplated that the side edges of panels A and C may be connected so as to form one, long, continuous piece (not shown). The side edges of panels A and C may optionally comprise attachment means (not shown) in order to removably secure the side edges of panels A and C to one another. Means for attaching the side edges may include, but are not limited to, a strip of hook and loop fastener strips such as those produced under the trademark VELCRO, a zipper, and buttons that snap into each other.

The cover panels A, B and C may be manufactured from fabrics that are water repellent and have a smooth, soft inner layer so as to not harm the finish of the vehicle. One example of such a fabric is Sunbrella®. However, it is contemplated that a variety of different fabrics may be used. Additionally, the fabric may be decoratively colored with fade resistant dies that may include logos, slogans, artwork or other designs not unlike the kind bumper stickers presently display. In addition to fabric, the cover panels may be manufactured from materials including, but not limited to, vinyl, polyester, nylon, gortex, plastic tarp, canvas, and rayon.

In a similar manner as cover 4 protecting the front outer cab of the automobile, cover 4 may be adapted to protect the rear window of certain vehicles, such as pick-up trucks, by the addition of an optional back panel (not shown). This back panel would be attached to panel B along the back side of panel B, and would be designed and sized to substantially cover the rear window of an automobile.

Additionally, cover 4 may only comprise front panel A and roof panel B. Side panels C may be left out, leaving the side door windows exposed.

Figure 2:
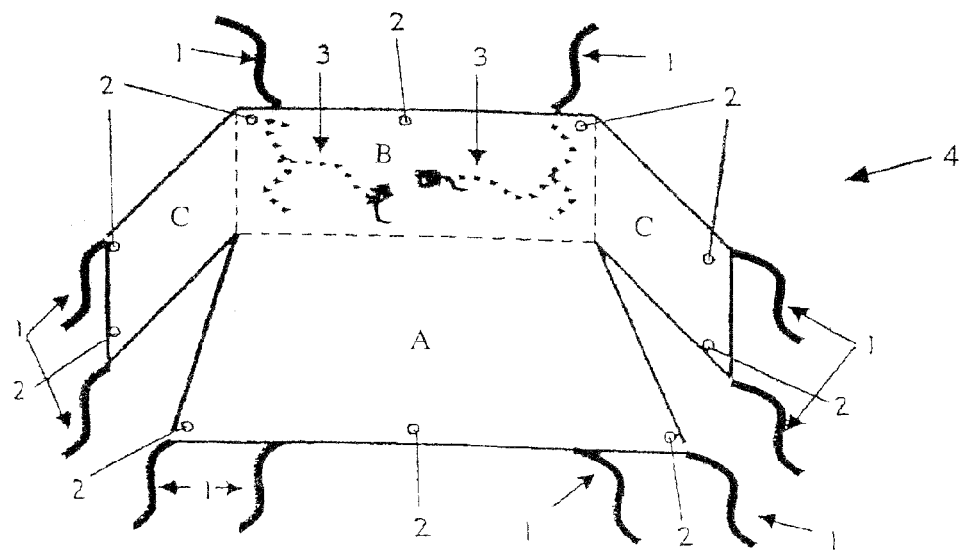
FIG. 2 is a perspective view of the top side an exemplary automobile cab cover device according to the present invention.
Figure 3:
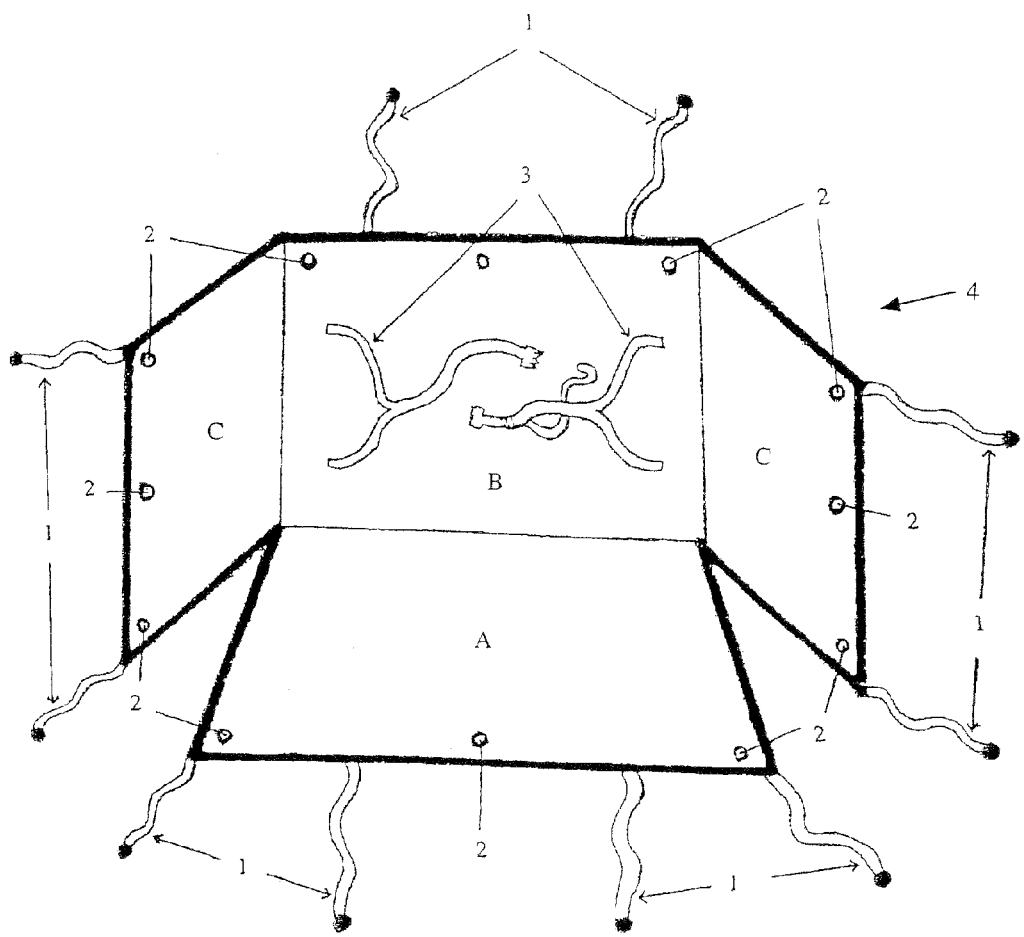
FIG. 3 is a perspective view of the underside of an exemplary automobile cab cover device according to the present invention.

As seen in FIGS. 2 and 3, cover 4 may comprise a mechanism that runs through the inside of the automobile and secures cover 4 to the automobile. This mechanism may include strong thin straps 3 that are sewn, or otherwise attached, to the underside of roof panel B of cover 4 over or near each front door section (i.e., the left side and the right side of panel B). Straps 3 may form a "Y" shape. However, it is contemplated that straps 3 may form a variety of other shapes as well. In operation, each strap 3 will run from roof panel B in between the top of each front door (passenger side and driver side) and the roof of the vehicle, and will connect with the other strap 3 inside the cab of the vehicle in order to hold cover 4 in place on the vehicle. Straps 3 may also act as a theft deterrent. The size, or length, of straps 3 may be adjustable. Straps 3 may connect with each other using a variety of locking mechanisms including, but not limited to, buckles (including a back-pack buckle), a key chain plastic snap, plastic hooks with a ring, and hook and loop fasteners. Straps 3 can also employ suction cups that may be attached to the front windshield.

Cover 4 also comprises magnetic straps 1 used to attach the various panels (A, B & C) to the outside metallic surface of the vehicle. At least one magnetic strap 1 is attached to each panel, preferably around the outer seams or near an edge of the panel. As seen in FIGS. 2 and 3, two magnetic straps 1 are attached to panels B and C around their outer seams and four magnetic straps 1 are attached to Panel A around its outer seams. It is contemplated that the number of straps attached to each panel may vary.

Magnetic straps 1 may comprise magnets sewn onto weatherproof fabric strips and covered by a strong thin, smooth, water resistant cloth so as to not damage the finish of the vehicle. In an exemplary embodiment, magnetic straps 1 comprise magnets with a minimum strength of grade n40. Magnetic straps 1 may employ horse shoe magnets, electromagnets, coated magnets, and any other magnets known in the art. Materials that may be used for the outer portion of magnetic straps 1 (i.e., the portion that holds the magnets) may include, but are not limited to, nylon bands, elastic bands, elastic cords, rope, twine, string, and cable.

Magnetic straps 1 may be attached or held down to the cover panels using a variety of means including, but not limited to, grommets, hook and loop fasteners. "crocodile" clips, grip clips, tarp clips, alligator clips, and sign clamps. Magnetic strips 1 may also simply be sewn on to the cover panels. Preferably, magnetic strips are rotatably attached to the cover panels, allowing magnetic strips 1 to adapt to and accommodate any movement by cover 4. For example, each magnetic strip 1 may be designed to swivel about the cover panel to which it is attached. Additionally, each magnetic strip 1 may be designed to swivel or rotate about the vehicle at the point of its attachment to the vehicle.

Cover 4 may also include grommet holes 2 placed strategically around the outer seams of the cover panels in order to secure cover 4 to the vehicle with bungee cords or other securing means. Grommet holes 2 may be helpful in the rare cases of a vehicle being made of some non-magnetic material such as aluminum or fiber glass. Grommet holes 2 may also be used to simply provide additional means of securing cover 4 to the vehicle.

Figure 4:
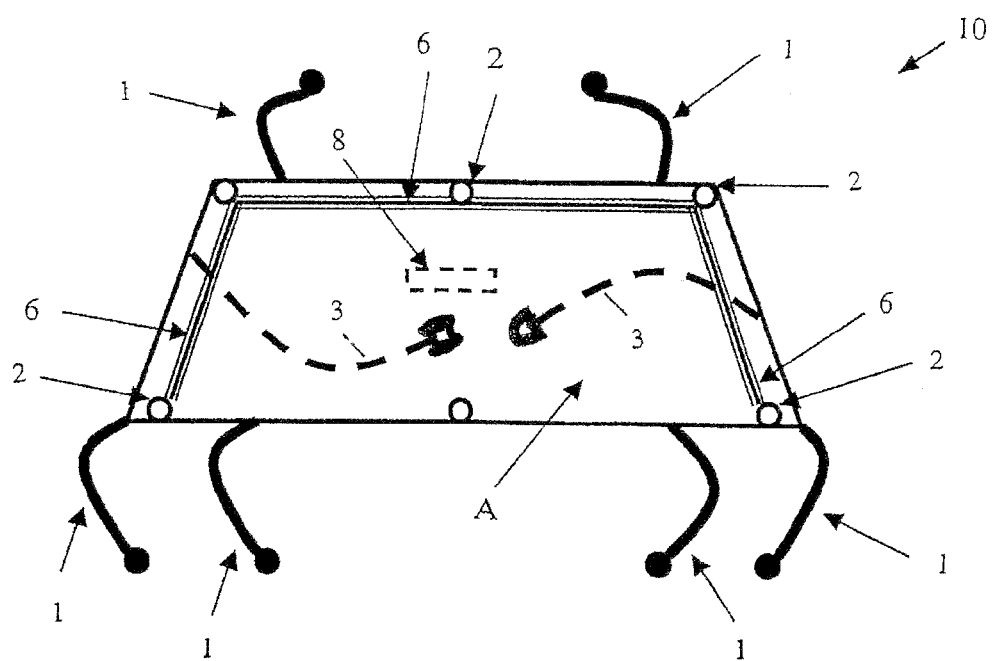
FIG. 4 is a perspective view of the top side of another exemplary automobile cab cover device according to the present invention.

FIG. 4 illustrates an alternative embodiment of the present invention, where cover 10 comprises front panel A designed to substantially cover the front windshield of an automobile. Front panel A may be about the same size as the front windshield of an automobile. In order to simplify the manufacture and the application of cover 10, cover 10 may exclude roof panel B and side panels C. In this way, cover 10 would only serve to protect the front windshield of the automobile.

Cover 10 comprises magnetic straps 1 used to attach front panel A to the outside metallic surface of the vehicle. It is contemplated that the number of magnetic straps 1 attached to front panel A may vary. However, preferably at least two magnetic straps 1 are attached near the top edge of front panel A and at least two magnetic straps 1 are attached near the bottom edge of front panel A. In FIG. 4, there are two magnetic straps 1 attached near the top edge of front panel A and four straps attached near the bottom edge of front panel A.

Cover 10 may also comprise a strap organizer 8 within panel A for securing magnetic straps 1 when cover 10 is not in use. Strap organizer may be any material to which magnetic straps 1 will attach, including, but not limited to, a piece of metal. When the user removes cover 10 from the automobile, he or she may attach magnetic straps 1 to strap organizer 8 so that magnetic straps 1 do not dangle freely. It is contemplated that in addition to being placed on panel A, strap organizer 8 may be placed in or on any of the panels.

Cover 10 may also comprise the same straps 3 as in FIGS. 2-4 that runs through the inside of the automobile and secures cover 10 to the automobile. Straps 3 may be sewn, or otherwise attached, to the underside of front panel A of cover 10 over or near each front door section (i.e., the left side and the right side of panel A). Straps 3 may form a "Y" shape. However, it is contemplated that straps 3 may form a variety of other shapes as well. In operation, each strap 3 will run from front panel A in between the front door (passenger side and driver side) and the portion of the car frame either on the left and right side of the front windshield. It will then connect with the other strap 3 inside the cab of the vehicle in order to hold cover 10 in place on the vehicle. Straps 3 may also act as a theft deterrent. The size, or length, of straps 3 may be adjustable. Straps 3 may connect with each other using a variety of locking mechanisms including, but not limited to, buckles (including a back-pack buckle), a key chain plastic snap, plastic hooks with a ring, and hook and loop fasteners. Straps 3 can also employ suction cups that may be attached to the front windshield.

It is contemplated that front panel A may be slightly bigger than the front windshield and comprise additional material in order to cover a small portion of the roof, the side doors, and/or the hood of the automobile.

It is also contemplated that additional individual panels, such as roof panel B or side panels C, may be attached to panel A as desired by the user. In a preferred embodiment, hook and loop fastener strips 6 are positioned near the edges of panel A in order to secure any additional panels having their own hook and loop fastener strips. However, it is contemplated that any other suitable attachment means may be used as well, including, but not limited to, buttons and snap fasteners. In FIG. 4, hook and loop fastener strips 6 are positioned near the top edge and side edges of front panel A.

Figure 5:
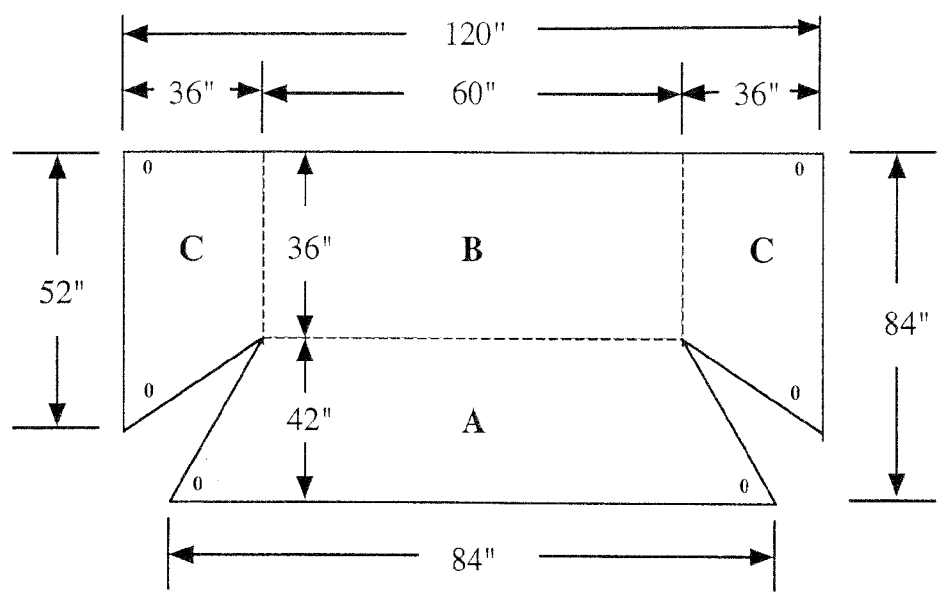
FIG. 5 is a plan view illustrating the measurements of one embodiment of the automobile cab cover device according to the present invention.

FIG. 5 illustrates the preferred measurements of one embodiment of the automobile cab cover device of FIG. 1. Taking a plan view of the cover, the preferred width of the entire cover is 120 inches (305 mm), the preferred width of side panel C is 36 inches (91.5 mm), the preferred width of roof panel B is 60 inches (152.5 mm), and the preferred width of front panel A at its widest point is 84 inches (213.5 mm). The preferred height of roof panel B is 36 inches (91.5 mm), the preferred height of front panel A is 42 inches (122 mm), the preferred height of side panel C at its longest point is 52 inches (132 mm), and the preferred height of the entire cover is 84 inches (213.5 mm). Preferably, the measurements of the cover are substantially equal to these measurements plus or minus about 5 inches. However, it is contemplated that the measurements of the automobile cab cover may vary.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention.

What is claimed is:

1. A cover for protecting the forward cab portion of an automobile having a roof, a front windshield, a front passenger side window, and a front driver side window, the cover comprising:
    a roof panel having a top surface, an opposing bottom surface, a front side, an opposing back side, a right side, and an opposing left side, the front, back, right and left sides all form the perimeter of the roof panel, the roof panel being sized to substantially cover the roof of the automobile;
    a front panel removably attached along the front side of the roof panel using a releasable attachment means, the front panel being sized to substantially cover the front windshield of the automobile;
    a passenger side panel removably attached along the left side of the roof panel using a releasable attachment means, the passenger side panel being sized to substantially cover the front passenger side window of the automobile;
    a driver side panel removably attached along the right side of the roof panel using a releasable attachment means, the driver side panel being sized to substantially cover the front driver side window of the automobile;
    at least one strap attached to each of the front panel, the passenger side panel, and the driver side panel, wherein the at least one strap is coupled with at least one magnet for attaching the at least one strap to the automobile;
    a first Y connection strap having a first end, a second end and a first portion of a locking mechanism coupled to the second end, the first end further comprising two ends attached to separate corners of the bottom surface of the roof panel and adjacent the right side of the roof panel; and
    a second Y connection strap having a first end, second end and a second portion of a locking mechanism coupled to the second end, the first end further comprising two ends attached to separate corners of the bottom surface of the roof panel and adjacent to the left side of the roof panel, wherein the second end of the first Y connection strap and the second end of the second Y connection strap each comprise a mating portion of the locking mechanism for releasably coupling the first Y connection strap to the second Y connection strap within an interior portion of the automobile.

2. The cover of claim 1, wherein the at least one strap is attached to each of the front panel, the passenger side panel, and the driver side panel adjacent to at least one outer seam of the panels.

3. The cover of claim 1, wherein the magnet has a minimum strength of grade n40.

4. The cover of claim 1, wherein the at least one strap, the first Y connection strap and the second Y connection strap comprises an elastic material.

5. The cover of claim 1, wherein the front panel is configured to cover a portion of a hood of the automobile.

6. The cover of claim 1, wherein the passenger side panel and the driver side panel are configured to cover a door handle and a keyhole of the automobile.

7. The cover of claim 1, wherein the passenger side panel is about half the size of the front passenger side window and the driver side panel is about half the size of the front driver side window.

8. The cover of claim 1, wherein the roof panel, the front panel, the passenger side panel, and the driver side panel all comprise water repellent material.

9. The cover of claim 1, wherein at least one of the first Y connecting strap or the second Y connection strap comprises is adjustable in length.

10. The cover of claim 1, further comprising at least one strap organizer coupled to at least one panel of the cover.

11. The cover of claim 1, wherein the releasable attachment means comprises at least one strip of hook and loop fastener.

12. The cover of claim 1, further comprising:
    a third Y connection strap having a first end, a second end and a first portion of a locking mechanism coupled to the second end, the first end further comprising two ends attached to separate corners of a bottom surface of the front panel and adjacent the right side of the front panel; and
    a fourth Y connection strap having a first end, second end and a second portion of a locking mechanism coupled to the second end, the first end further comprising two ends attached to separate corners of the bottom surface of the front panel and adjacent to the left side of the front panel, wherein the second end of the third Y connection strap and the second end of the fourth Y connection strap each comprise a mating portion of the locking mechanism for releasably coupling the third Y connection strap to the fourth Y connection strap within an interior portion of the automobile.

13. The cover of claim 12, wherein at least one of the third Y connecting strap or the fourth Y connection strap comprises is adjustable in length.

14. The cover of claim 12, further comprising at least one strap organizer coupled to the front panel.

* * * * *